United States Patent [19]
Halter

[11] Patent Number: 5,280,171
[45] Date of Patent: Jan. 18, 1994

[54] PROCESS AND APPARATUS FOR THE NON-CONTACTING DETECTION OF EDGES OF OBJECTS

[75] Inventor: Peter U. Halter, Frauenfeld, Switzerland

[73] Assignee: Baumer Electric AG, Fraunfeld, Switzerland

[21] Appl. No.: 913,941

[22] Filed: Jul. 17, 1992

[30] Foreign Application Priority Data

May 6, 1992 [CH] Switzerland .......................... 1459/92

[51] Int. Cl.⁵ .............................................. G01N 9/04
[52] U.S. Cl. .................. 250/223 R; 271/262
[58] Field of Search ................. 250/561, 571, 223R; 271/262; 356/429, 448; 235/89R

[56] References Cited

U.S. PATENT DOCUMENTS

| | | | |
|---|---|---|---|
| 4,217,491 | 8/1980 | Dufford, Jr. et al. | 250/223 R |
| 4,281,243 | 7/1981 | Hudler | 250/223 R |
| 4,450,352 | 5/1984 | Olsson | 250/223 R |
| 4,778,986 | 10/1988 | Lundberg et al. | 250/223 R |

Primary Examiner—David C. Nelms
Assistant Examiner—K. Shami
Attorney, Agent, or Firm—Walter C. Farley

[57] ABSTRACT

In an edge detector process, a working plane (A) is scanned by a focussed light beam, e.g. a laser beam emitted by a light source (L) projected at an angle of typically 40° to 45° from the working plane. A first and a second detector (D1, D2) receive the scattered light from the working plane. The first detector (D1) is positioned behind a focussing imaging optics (0), such as an off-axis parabolic mirror, which is arranged coaxially, i.e. all round the laser beam, or is positioned below the emitted light beam relative to a main working plane (H). The second detector (D2) is positioned approximately over the light spot produced by the emitted light on the main working surface. The stray light measured by the first detector (D1) is therefore received at an angle to the main working plane, which is equal to or smaller than the angle between the emitted light and said plane.

An apparatus according to the invention has imaging optics (0) and one of the detectors is positioned in such a way that it measures scattered measured light along the main axis of the incident laser beam or at an angle which is smaller than that between the main laser light axis and the main working plane.

21 Claims, 2 Drawing Sheets

PROCESS AND APPARATUS FOR THE NON-CONTACTING DETECTION OF EDGES OF OBJECTS

FIELD OF THE INVENTION

The invention relates to a process and an apparatus for the non-contacting detection and evaluation of edges of an object or edges of a plurality of objects.

BACKGROUND OF THE INVENTION

It is known that in light dispersion or scattering on a matt surface, e.g. on white paper, the intensity of the dispersed light is dependent on the angle of incidence of the light and the observation direction of the dispersed light. It is possible to derive from indicatrix, that with two detectors receiving the dispersed light from a light spot on white paper at different angles, a clear decision can be made as to whether the paper rests flat on the substrate or is strongly inclined (Reflexionsspektroskopie, G. Kortum 1969, Springer-Verlag, Berlin). With suitably chosen angles this phenomenon is similar to the case of a slightly to highly glossy surface. The stray light intensity in the reflection direction is increased strongly, whereas in the remaining directions there is an overall intensity decrease. If the stray light intensity is indicated as a function of the observation angle, this roughly gives the shape of a circle with a lobe in the reflection direction. In other words, when the light strikes the surface obliquely, the stray light intensity in a direction area close to the reflection direction (forward scattering) is greater than the stray light intensity in a direction area close to the direction of the incident light (backward scattering). The difference in the ratio of the light intensities of rearward and forward scattering is increased with a decreasing angle between the surface and the incident light. For certain surface characteristics, there can be a deterioration in the detection compared with white paper, but this is normally small. Only in rare cases are surfaces obtained which diverge from this and, in addition to a forward brightness or gloss in the reflection direction, also have a rearward brightness or gloss in the laser beam direction. A disturbing rearward gloss or brightness does not occur in the case of raw or printed paper.

For example, U.S. Pat. No. 4,450,352 to Olsson discloses a process and an apparatus for measuring this type of reflection with a light source and several, namely at least three detectors (an apparatus with two light sources and two to three stray light detectors is also described in WO-85/05206). Both apparatuses are used as scale flow detectors for the non-contacting counting of printed products and are correspondingly designed. As the light source for illuminating the printed products, exactly parallel laser light is proposed in the first specification and is used for obliquely illuminating the object to be measured and a plurality of photosensitive detectors, preferably three such detectors are used for the comprehensive measurement of the stray light from different directions for faultfree counting of the printed products in a scale flow. As a result considerable costs are involved for ensuring the necessary reliability of the measurement.

According to the prior art, overlapping objects are moved as a scale flow with the edges oriented in the running direction on a plane and the edges of the objects are illuminated in oblique manner with laser light at an acute angle to the plane. The laser light scattered by the objects is measured by at least two measuring cells, which are positioned in such a way that they measure the stray light along at least two propagation directions with different angles to the plane on which the objects are conveyed. One measuring cell is at an acute angle to the plane and the irradiation direction of the laser on the other side of a vertical line through the laser spot, while the other measuring cell is between the propagation direction on the other side of the vertical line and the incident laser beam, so that when an object edge enters said light beam compared with the light reflected back to the first measuring cell, said other measuring cell or cells receive more light. This arrangement illustrates why the necessary measuring reliability cannot be obtained with two detectors through the lack of adequately good resolution and as a result attempts are made to increase this information by using three or more detectors.

SUMMARY OF THE INVENTION

An object of the invention is to provide a two-detector method using only one light source to obtain comprehensive measurement results by the measurement of the forward and backward scattering.

The aforementioned disadvantages of the prior art can be eliminated by a measuring technique in which:

1. The intensity of the stray light is measured, on the one hand at an angle between the main working plane (plane on which the objects are located) and detected stray light, which is equal to (along the light beam emitted by the apparatus) or smaller than the angle between the emitted light and the main working plane (e.g. conveyor belt) and also in a region over the very small light spot (light spot for increasing the resolution) produced by the emitted light on the main working plane, i.e. in a direction area in the vicinity of the perpendicular through the light spot, arbitrarily with a small inclination from said perpendicular on one or the other side of the incident light beam.

2. An optical device is provided in such a way that a detector of appropriate size (optionally with an upstream mask) is located behind focussing imaging optics (e.g. off-axis parabolic mirror, lens), so that there is an ideal signal course for surfaces (working plane) up to the sensor casing front (arrangement of the light source, detectors, etc. in a casing), which covers the measuring range from the bearing surface of the observed objects (main working plane) to close to the windows in the casing front.

3. Signal processing (e.g. quotient signal) is performed in accordance with the invention.

The measurement is broadened for special purposes by additional detectors.

An apparatus constructed according to the invention consequently differs through the use of imaging optics for an ideal signal course and focussing optics which focusses the emitted light beam (preferably laser light), in order to make the light spot as small as possible and consequently one of the detectors is so positioned that it measures the scattered measuring light along the main axis of the incident light beam or at an angle to the main working plane, which is smaller than the angle between the main axis of the emitted light and said plane. The apparatus also differs by specific signal processing means. The arrangement of a detector with a detection angle (angle between the scattering direction of the detected stray light and the main working plane) equal to or smaller than the irradiation angle of the laser light (angle between the light beam emitted by the light source and the main working plane) and the use of an imaging optics, as well as a sharp, bright light spot, together represent the essential differences compared with the prior art. Considered macroscopically in the range 1/100 mm, an edge of a thin object, e.g. a paper edge has a surface inclined by up to 90° relative to the main working plane. If the light spot is sufficiently small, i.e. compared with the object thickness, then such a fine edge can be detected as an "inclined surface". Additionally with a light beam directed obliquely against the main working plane a flat object can shadow this beam for one of the detectors, so that the intensity ratio in the forward/backward direction is reduced and the object detection is facilitated. If the light spot can be made sufficiently small, it is possible without difficulty to detect edges of individual paper sheets each having a thickness of 0.1 mm, even if the latter rests firmly on the main working plane.

Another arrangement is such that the light beam is directed more or less perpendicularly on the main working plane and that the stray light on either side of the emitted beam is detected with the same or different angles between said detected stray light and the emitted light beam.

Apart from being usable for the general detection of edges of objects and the evaluation of signals related thereto, the sensor according to the invention can also be used for the position detection and counting of objects which have edges. In the represented embodiment said objects are less than e.g. 80 mm from the sensor observation window and can be moved past at a speed of several m/s. The objects can have slightly oblique surfaces (chamfered edges) relative to the main working plane and in the case of flat objects, such as paper sheets, edges up to 0.1 mm can be detected. The objects can have one or more colours and to a certain extent can also be glossy. They can also be superimposed in scale form (scale formation/flow).

The sensor functions on the basis of light, generally with a laser and for certain applications it is also possible to use a light-emitting diode or another light source.

In the construction as a scale flow detector, additionally a circuitry dead time function ensures that double edges, such as e.g. the prefold in a folded sheet is only evaluated as one edge. Furthermore, with further appropriate measures (quotient signal formation) it is possible to suppress different problems and interferences which can influence the measuring reliability.

In a first embodiment a focussed laser beam at an angle of typically 40° senses the surfaces of objects resting on the working plane. Two detectors receive the light dispersed by the working plane. One of the detectors is placed optically behind focussing imaging optics (e.g. a deflecting off-axis parabolic mirror), which is positioned coaxially, i.e. all around the emitted laser beam, or very close to the latter. The other detector is positioned roughly over the light spot formed by the emitted light on the main working plane.

In another embodiment a detector is positioned in the vicinity of the focal point of imaging optics, e.g. a lens, in such a way that it measures stray light which is irradiated in a shallower angle to the working plane than the light emitted by the light source, whereas the other detector is arranged substantially vertically above the light spot.

Physical considerations show that a static signal evaluation is possible, i.e. an evaluation which is independent of the movement speed of the objects. They also show that the ratio of the light intensities measured by the two detectors, i.e. the quotient, is the decisive quantity and not the intensity difference, as is generally used in the aforementioned prior art. Signal evaluation can take place digitally and in analog manner. The quotient of the intensities measured by the two detectors can be obtained directly by the division of the two measured values. The quotient can also be formed by regulating the light power of the light source so that one of the detectors, advantageously that detecting the rearward scattering, measures a constant intensity. Therefore the other detector directly supplies a quotient signal. As the regulation of the light source may in some cases not be able to sufficiently rapidly compensate strong intensity differences, it is also advantageous with a quasi-constant signal of one detector to perform the division of the measured signals for producing the quotient signal.

In order that the evaluation of the analog signal is independent of the distance between the sensor and the objects (working plane), i.e. independent of the object thickness, it is necessary to adapt the optics. For a planar object (not its edge) at a random height (less than e.g. 80 mm below the sensor window), the intensity ratio of the rearward to forward scattered light (R/V) of the two detectors must never become larger than in the case of a planar object in the main working plane, .e.g. 80 mm below the sensor window. To this end one of the detector heads is preferably slightly inclined and moved back into the casing and the upstream optics and the other detector head are correspondingly optimized.

For use as a scale flow detector additional measures are taken. Using a dead time function, e.g. with a pulse counter counting the shaft encoder pulses of the conveyor belt on which the objects to be scanned are conveyed, it is possible to process double edges (e.g. the prefold in a folded sheet) as only one edge from the signal standpoint. All pulses within a certain time, or within a certain distance from a first pulse are suppressed.

Further faults and interferences can be eliminated with a suitable background object (white paper, aluminium sheet, reflecting foil). In the case of folded sheets, which are supplied to the laser beam with the fold or back forwards, the sheet ends can be roughened or curved, even if they are not covered by consecutive products. An edge is then detected at the start and finish of the sheet. If the background is constituted by a reflecting foil, the signal level is reversed in such a way that the end pulse is suppressed. This reversal is brought about in that the foil scatters much more light in the rearward direction than normal paper. Such a signal would correspond to a paper edge. As this signal remains constant up to the next paper edge, it can be suppressed by digital signal processing.

Another possibility for the suppression of the undesired detection of terminal edges is the arrangement in the sensor of a third detector D3 which is coordinated with a slightly inclined mirror located in or below the main working plane. If a product is located on the main working plane the mirror is covered and encounters little or no light in the third detector. If there is no product on the main working plane, the mirror reflects the emitted light beam into the third detector. If the third detector receives light immediately after the detection of an edge, it must have been a rear or trailing edge, whose counting must be suppressed. In place of the mirror, it is also possible to use a surface carrying the light spot positioned below a corresponding opening in the main working plane and spaced from the latter, provided that there is no object on the main working plane. The third detector is then positioned in such a way and provided with imaging optics, so that it "sees" the light spot on said surface.

BRIEF DESCRIPTION OF THE DRAWINGS

The above principle will be discussed in greater detail hereinafter using the example of the scale flow detector and relative to the following drawings, wherein.

In a schematic representation of the method, it is possible to use as a basis the following fundamental arrangement.

A) A light beam from a radiation source is directed in a well focussed manner onto the main working plane and inclined at a random angle strikes said plane perpendicularly, so as to produce a light spot. At least two detectors observe at different angles the light spot produced on the main working plane or an object located thereon, the following conditions being pre-established.

Figure 2:
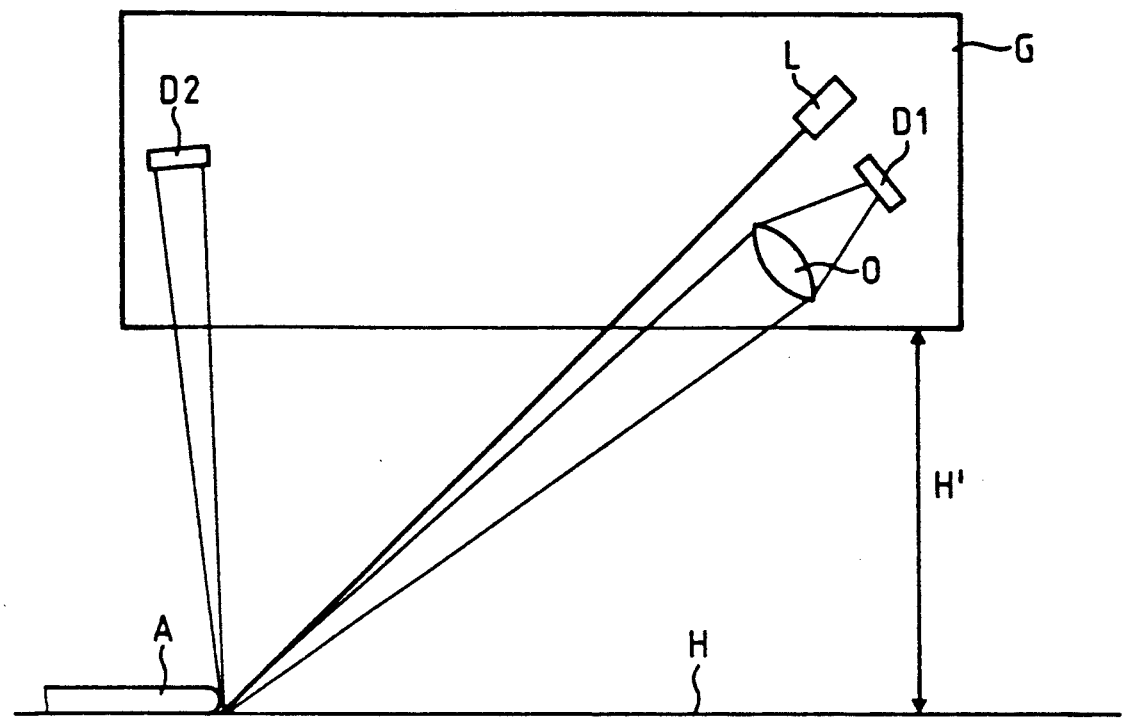
FIG. 2 is a side elevation of a first measuring arrangement in accordance with the invention with a light source and detectors above a working plane and wherein one of the detectors measures rearwardly scattered light which is reflected in an angle smaller than the angle of the light beam directed onto the working plane.
Figure 3:
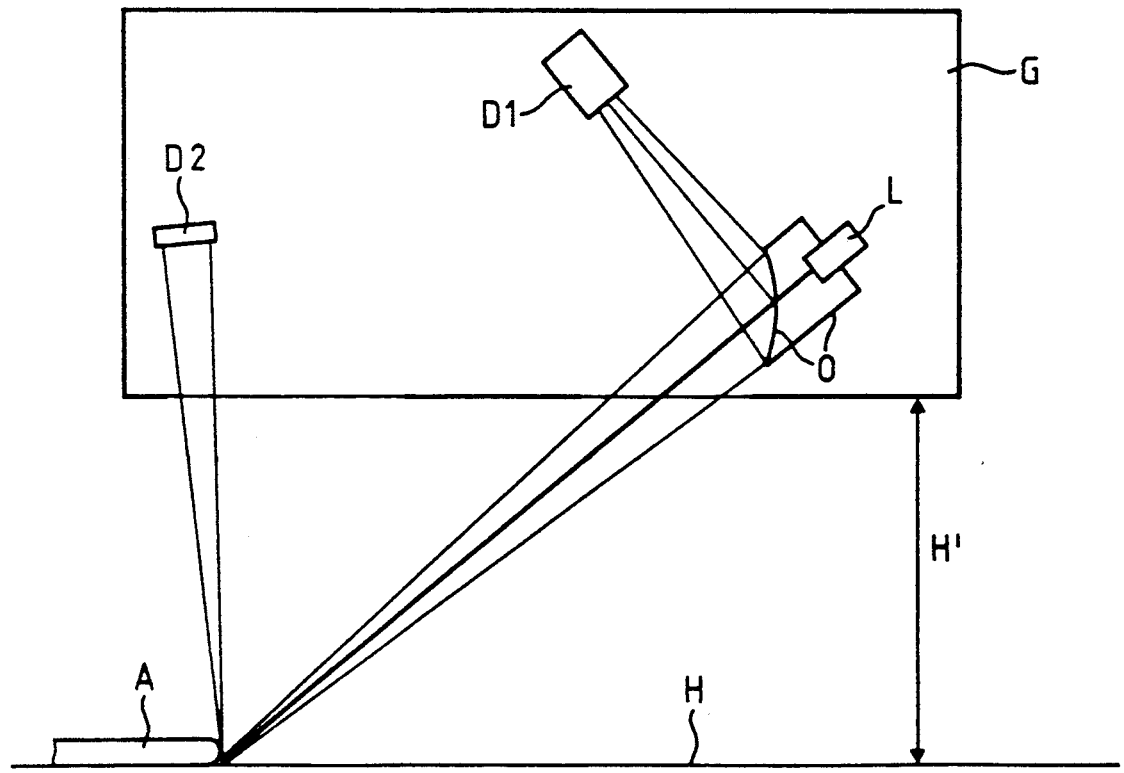
FIG. 3 is a side elevation of a second arrangement in accordance with the invention in which one of the detectors measures light reflected back coaxially with the light beam.

A1. One detector D1 is positioned optically behind the imaging optics O (e.g. a parabolic mirror or lens), which images the light spot on the working plane of that detector. The detector and imaging optics are arranged relative to the light source in such a way that the angle between the light beam illuminating the main working plane from the light source and the light returning to the detector from the main working plane (light spot) is very small (FIG. 2). This angle disappears if the radiation source and imaging optics or detector are coaxially arranged and the beam is passed through an opening in the optics, e.g. in the parabolic mirror (FIG. 3).

A2. The other detector D2 is positioned in such a way that the intermediate angle between the light from the main working plane (light spot) on the detector D1 and on the detector D2 is as large as possible.

It is pointed out in connection with A that the light source can emit light at a more or less shallow angle or perpendicularly toward the main working plane. The quotient signal (D2/D1) of the two detectors and at least the reciprocal value (D1/D2) is evaluated.

B) For the detection of very fine paper edges, the following additional conditions are fulfilled.

B1. The light spot produced by the light source on the main working plane must be as small as possible, i.e. it must have dimensions which at the most roughly correspond to the smallest edges to be detected and for this purpose the focussing of the light beams emitted by the light source must be optimized.

B2. Advantageously the light source radiates at a very shallow angle on the main working plane (e.g. 40°), so as to illuminate and not overlook fine object edges. In the case of vertical light incidence and an already cut paper edge only the shadowing of the light can be utilized and not also the variable radiation characteristic of the paper as a function of the illumination angle.

B3. The second detector D2 measures the stray light from the light spot under a maximum angle to the first detector D1, which is positioned close to the light source or the light beam emitted by it. The second detector D2 is located roughly perpendicularly over the light spot on the main working plane or even further from the light source, so that it observes the light spot at an angle of 90° to the main working plane or at an acute angle opposed to the light source.

C) For a large measuring range in the case of a very compact sensor design, the following additional measures are necessary:

C1. a not too large angle must be produced between the light from the light spot striking the first detector D1 and the light from the light spot striking the second detector D2, so that C2. either the light source irradiates in a not too shallow manner and under certain circumstances roughly perpendicularly onto the main working plane and in the case of a relatively shallow light incidence the second detector D2 is positioned more or less directly over the light spot on the main working plane.

In connection with C it is pointed out that the term apparatus or sensor with a compact design is understood to mean one whose casing size is not large compared with the measuring range.

D) To avoid or reduce a blind area, the light source is placed between the two detector.

In connection with D it is pointed out that the light spot on large objects extending just below the sensor casing is, in this arrangement, best detected by the second detector D2. This is important, because the sensor emits a signal, which would correspond to an edge, as soon as the detector D2 only receives little light compared with the detector D1.

Figure 1:
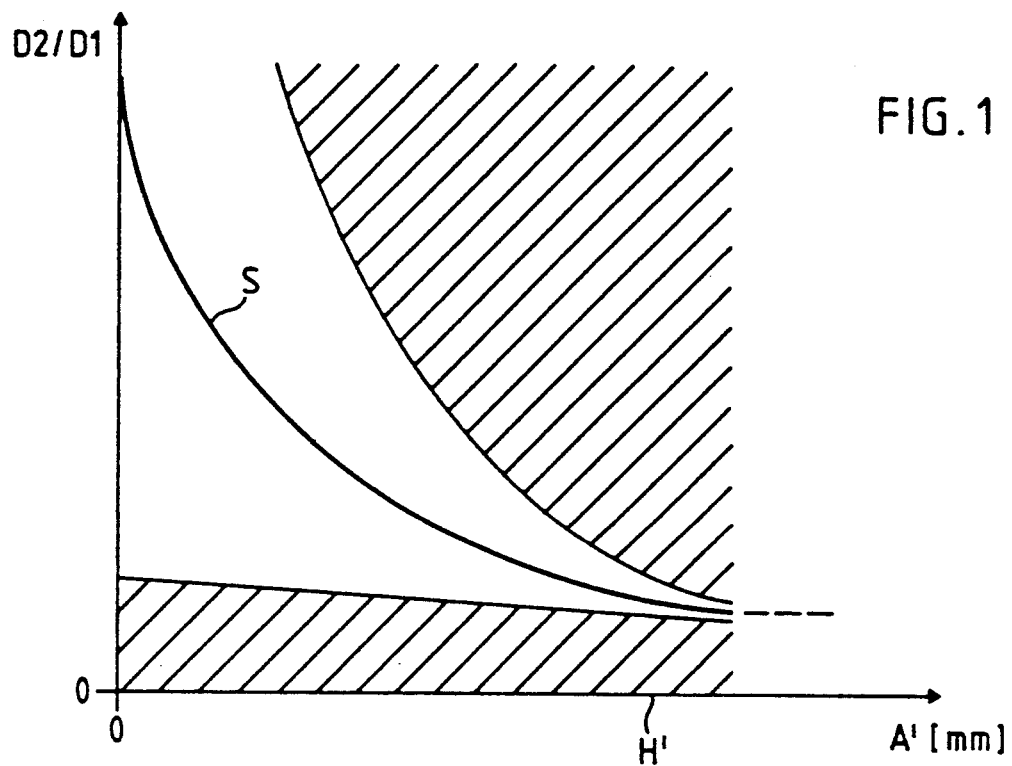
FIG. 1 is a graphical representation of an analog signal processed in accordance with the invention wherein the zero level corresponds to that of the observation window in a sensor casing and the hatched areas indicating zones in which there is to be no measuring signal.

FIG. 1 shows a signal curve S of an analog division signal (signal of detector D2 divided by the signal of detector D1, D2/D1 for short) for an object with a horizontal surface of white paper as a function of the vertical distance or height (A' in mm) of said surface below the sensor, in its ideal form. This has been based on a value of the signal for an object surface in the main working plane H, whose height under the sensor is given as H' and which is in this example 80 mm. It is possible to see the asymptotic curve outside the optimized spacing of the working surface. The hatched areas show zones which should not touch or intersect the division signal, but these areas are only shown in typical manner and constitute border zones, the working area being located between them. In the case of a reversed division signal $(D2/D1)^{-1}$, it is necessary to use the reciprocal 1/x for each signal value in FIG. 1.

The advantages of such an ideal signal curve are as follows:

1) decrease of the edge and therefore also the interference susceptibility relative to small unevennesses of the object surfaces with increasing height over the working surface and 2) no blind area, i.e. no supposed edge detection if an object comes close to the sensor—the object could be multiply counted if, at the end of the dead time, the object is still very close below the sensor.

White, horizontally positioned paper as the object surface gives for all heights or levels a typical signal. For other signals there is only a minor downward modification of the signal, e.g. a signal reduction of approximately 30%. In the case of glossy, horizontally positioned surfaces, there can be a massive upward divergence of the signal, although this does not constitute a disturbance. It is therefore sensible to give a standardized signal curve for white paper.

The signal curve is obtained as a function of the height A' (mm) below the sensor by an appropriate choice of the imaging optics, in which numerous interdependent factors play a part, such as: the focal length of the imaging optics upstream of the detector D1, the distance of the detector D1 below the imaging optics, the lateral positioning of the detector D1 behind the optics, the size and shape of the detector (i.e. the photodiode size, if necessary, the size and shape of an upstream mask, which can also be positioned upstream of an additional lens, in order to further concentrate the light to the photodiode), the angle between the stray light detected by the detector D1 and the light beam emitted by the light source, the positioning of the detector D2 (depth behind the sensor window), lateral tilting of the detector D2 relative to the sensor front, and observation angle of the two detectors relative to the main working plane or the surfaces of the observed objects.

All these factors must be matched to one another in such a way that the given, ideal signal curve is obtained, there being a certain design freedom as to the way in which this is achieved. Therefore only an exemplified procedure is given here for the design and construction of an apparatus according to the invention. To obtain an optimum signal course, the aforementioned factors must be matched to one another by trial and error, because on adjusting the magnitude of one parameter, the values of the other parameters also change.

FIG. 2 shows a detector arrangement (sensor) according to the invention in a casing G with a laser head L with a laser diode and beam focussing lenses. The laser irradiates at an angle of typically 45° onto the main working plane H. A minimum beam diameter is achieved by focussing the emitted beam onto the main working plane H which, for the distance H' of e.g. 80 mm is located below the sensor window in the casing G, which is indicated here by a rectangular frame. The detector head D1 is positioned behind the imaging optics O (shown here as a lens). Radiation source L and detector D1 are very closely juxtaposed in such a way that the observation angle of detector D1 relative to main working plane H is smaller than the corresponding angle of the emitted laser beam. The optics is directed towards the laser beam and detector head D1 is positioned slightly behind the focal plane of the optics. The detector head D1 e.g. comprises a mask (horizontal slot with lateral boundary, i.e. a rectangular opening), a lens for focussing the light passing through the mask and an appropriately sized photodiode. On accepting limitations, it need only comprise a photodiode. Detector head D2 comprises a large-area photodiode or several small, lined up photodiodes and is inclined slightly outwards from a vertical line through the light spot, i.e. away from the light source. For an object in the main working plane H, D2 is positioned approximately over the light spot (inclined by roughly 10° relative to the vertical and in opposition to the laser beam) and is at a certain distance behind the entrance window of the casing G. This arrangement is not prescribed, but provides optimum results for a moderate sensor size, which ultimately has an effect on the price.

FIG. 3 shows another arrangement, in which one of the two detectors D1 measures the back-scattered light coaxially to the emitted light. A laser head L with laser diode and with lenses (not shown) for focussing the beam, radiates light onto the main working plane H at an angle of approximately 40°. The focussing is such that the minimum beam diameter is reached approximately 88 mm below the sensor casing G, where the main working plane H is located (cf. also FIG. 1). The detector head D1 measuring the coaxial stray light is placed behind an imaging optics O, in this case an off-axis parabolic mirror, which is positioned coaxially around the emitted light beam or very close to it. The imaging optics "looks" in the direction of the laser beam. The front of the detector head D1 is preferably in the focal plane of the imaging optics. Upstream of the detector is provided a mask, which has a horizontal slot with a lateral boundary, i.e. a rectangular opening. It is followed by a lens for focussing the light passing through the mask. A photodiode of appropriate size is located in the detector head D1. The detector head D2 has a simple photodiode, which has a more or less large surface, typically 5×5 mm and is inclined in the same way as in FIG. 2. For an object in the main working plane H it is positioned approximately vertically over the light spot at a certain distance behind the entrance window. The presently proposed arrangement gives optimum results for a sensor of moderate size, which also affects costs.

Further optimizing measures are advantageous for the optical measuring arrangement shown. The light source, here a laser diode, is regulated in such a way that detector D1 always receives the same amount of light. In place of the division stage used in the block circuit diagram of FIG. 4, it is possible to use logarithmic amplifiers, so that following a subtraction of the two channels a signal is obtained which corresponds to the logarithm of the quotient. For user-specific constructions it is possible to us a microprocessor for digital signal evaluation, e.g. double pulse suppression in the case of a prefold, etc., which makes the apparatus more flexible when new problems occur and permits easier adaptation thereto. When used as a scale flow detector, dead time functions are supplemented by a dynamic dead time. The time edge spacing is continuously determined, e.g. averaged over 5 to 10 edges and approximately 20% thereof is used as dead time.

Figure 4:
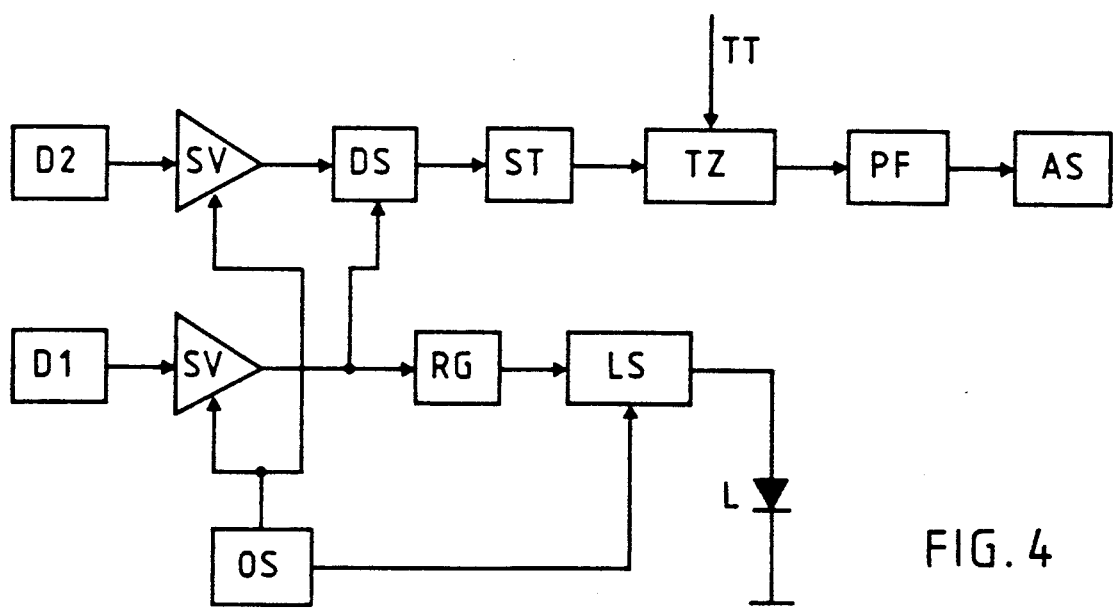
FIG. 4 is a schematic block diagram of a circuit arrangement for evaluating signals from light detectors in the arrangements of FIGS. 2 and 3.

FIG. 4 shows an exemplified circuit for evaluating the signals from detectors D1 and D2. The signals from the two detectors are supplied to in each case one synchronous amplifier SV with a sample and hold function for suppressing extraneous light. The two amplifier channels are synchronized with the aid of an oscillator OS. The same oscillator also times the power stage LS, through which the laser diode L, i.e. the light source, is supplied. By means of a regulator RG detector D1, i.e. that measuring the rearward scattering, controls the intensity of the light source S. In addition, the signals of the two detector channels are converted in a division stage DS to a quotient signal, which is processed in a Schmitt trigger ST and represents a counting signal. For counting a scale flow moving past the apparatus or other objects conveyed and having edges, a dead time function TZ is incorporated and functions in such a way that during an adjustable dead time further pulses from ST which are caused by double or multiple edges on an object, are suppressed. If a shaft encoder is available on the conveyor belt, its signal TT can be used in order to link or synchronize the dead time with the conveying speed. In this case, in place of an adjustable dead time, an adjustable number of shaft encoder pulses are counted, during which time further pulses from ST are suppressed. This function can also be very favorably and flexibly solved with a microprocessor. The thus conditioned signal is finally processed in a further pulse length shaper PF and supplied for further use to an output stage AS.

This block circuit diagram constitutes a possible evaluation of the stray light with the incorporation of information TT regarding the supply of the objects and with a light control by one of the detectors. This is one of many possibilities for evaluating the V/R stray light from the optical arrangement according to the invention. In place of the division stage DS used, if logarithmic signals exist, there can also be a subtraction of the two channels.

I claim:

1. A method for detecting an edge of an object on a surface comprising the steps of:
   generating a light beam and directing the light beam toward the surface so that the beam forms an acute angle with the surface and focusing the beam so that it creates a light spot on the surface,
   moving one of the beam or the object along the surface so that an edge of the object is illuminated by the light spot and so that light is reflected and scattered from the object in the area of the edge,
   detecting light forwardly scattered from the object,
   separately imaging and detecting light rearwardly scattered from the object,
   producing electrical signals representative of the detected light, and
   combining the electrical signals to obtain an output signal indicative of a detected edge.

2. A method according to claim 1 wherein the produced electrical signals represent values of detected scattered light and the step of combining includes generating a signal representative of a quotient of the values.

3. A method according to claim 2 wherein the rearwardly scattered light is detected in a region between the surface and the generated light beam.

4. A method according to claim 3 wherein the step of imaging includes focussing the rearwardly scattered light before detection.

5. A method according to claim 4 wherein the step of imaging also includes deflecting the rearwardly scattered light.

6. A method according to claim 1 wherein the step of imaging includes focussing the rearwardly scattered light before detection.

7. A method according to claim 6 wherein the step of imaging also includes deflecting the rearwardly scattered light.

8. A method according to claim 1 and including regulating the intensity of the light beam generated and directed toward the surface in accordance with the intensity of forwardly or rearwardly scattered detected light but not both.

9. A method according to claim 8 wherein the signals produced as being representative of light rearwardly and forwardly scattered are produced in synchronism with movement of one of the beam or object.

10. A method of detecting edges of objects traveling along a path on a surface comprising the steps of:
    emitting a beam of light focussed substantially at the surface to create a light spot on the surface,
    moving the objects along the path so that light from the beam is reflected from the objects,
    detecting reflected light at two locations separated by an obtuse angle, thereby selecting two beams of reflected light from the spot, and
    focussing one of the beams of reflected light before detection.

11. A method according to claim 10 and further including focussing the emitted light beam so that the light spot has a size substantially equal to the height of the smallest edge on an object to be detected.

12. An apparatus for detecting an edge of an object on a surface comprising:
    means for generating and directing a light beam toward a surface so that the beam forms an acute angle with the surface;
    means for focusing said beam so that it creates a light spot on said surface;
    means for moving said object along the surface so that an edge of said object is illuminated by said light spot and so that light is reflected and scattered from said object in the area of said edge;
    means for detecting light forwardly scattered from said object and for producing a first electrical signal in response to detected light;
    means for separately imaging and detecting light rearwardly scattered from said object and for producing a second electrical signal representative of detected light; and
    means for combining said first and second electrical signals to obtain an output signal indicative of a detected edge.

13. An apparatus according to claim 12 wherein said first and second electrical signals represent values of detected scattered light and said means for combining includes means for generating a signal representative of a quotient of said values.

14. An apparatus according to claim 13 wherein said means for imaging and detecting rearwardly scattered light is positioned between said surface and said means for generating and directing said light beam.

15. An apparatus according to claim 14 wherein said means for imaging includes means for focussing said rearwardly scattered light before detection.

16. An apparatus according to claim 15 wherein said means for imaging also includes means for deflecting said rearwardly scattered light.

17. An apparatus according to claim 12 wherein said means for imaging includes means for focussing said rearwardly scattered light before detection.

18. An apparatus according to claim 17 wherein said means for imaging also includes means for deflecting said rearwardly scattered light.

19. An apparatus for detecting edges of objects traveling along a path on a surface comprising
- means for emitting a beam of light focussed substantially at a surface to create a light spot on said surface;
- means for moving a plurality of objects along said path so that light from said beam is reflected from said objects;
- first and second means for detecting reflected light at two locations separated from each other by an obtuse angle, thereby selecting two beams of reflected light from said spot; and
- means for focussing one of said beams of reflected light before said light reaches said means for detecting.

20. An apparatus according to claim 19 and further including optical means for focussing said light beam so that light spot has a size substantially equal to a height of a smallest edge on said objects to be detected.

21. A method according to claim 8 wherein the step of combining includes forming a quotient of values of the electrical signals.

* * * * *